United States Patent

Hinman

[11] 3,739,894
[45] June 19, 1973

[54] BALL TRANSFER UNIT
[75] Inventor: Ronald C. Hinman, Mission Viejo, Calif.
[73] Assignee: Western Gear Corporation, Lynwood, Calif.
[22] Filed: Mar. 15, 1971
[21] Appl. No.: 124,234

[52] U.S. Cl. .............................. 193/35 MD, 16/26
[51] Int. Cl. ....................... B65g 13/00, B60b 33/08
[58] Field of Search ................... 193/35 B, 35 MD; 16/26, 25, 24, 21, 44

[56] References Cited
UNITED STATES PATENTS

| | | | |
|---|---|---|---|
| 2,617,509 | 11/1952 | Britton | 193/35 B |
| 1,963,956 | 6/1934 | Craig | 193/35 MD |
| 3,466,697 | 9/1969 | Cain et al. | 16/26 |
| 3,478,382 | 11/1969 | Nosenzo | 16/24 X |
| 631,804 | 8/1899 | Manley | 16/26 |
| 3,132,904 | 5/1964 | Wakamatsa et al. | 16/26 X |
| 3,096,536 | 7/1963 | Rabelos | 16/24 X |
| 3,557,401 | 1/1971 | Jenkins | 16/26 |
| 2,972,162 | 2/1961 | Townsend | 16/26 |

FOREIGN PATENTS OR APPLICATIONS

| | | | |
|---|---|---|---|
| 15,838 | 11/1887 | Great Britain | 16/24 |
| 1,150,429 | 1/1958 | France | 193/35 MD |
| 1,297,185 | 5/1962 | France | 193/35 MD |

Primary Examiner—Evon C. Blunk
Assistant Examiner—W. Scott Carson
Attorney—Huebner & Worrel

[57] ABSTRACT

A ball transfer unit including load spring means, locking means for releasably maintaining said unit within a structure and stop means for limiting the displacement of the ball when a load is positioned thereon.

3 Claims, 9 Drawing Figures

PATENTED JUN 19 1973

INVENTOR.
RONALD C. HINMAN
BY
Huebner & Worrel
ATTORNEYS.

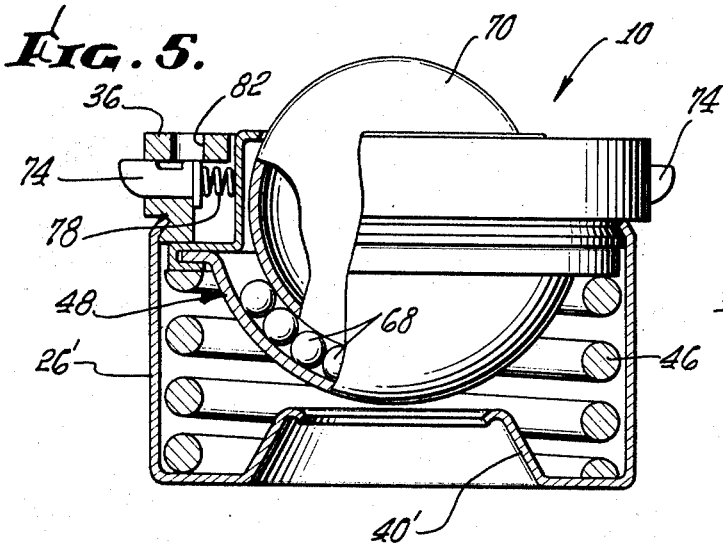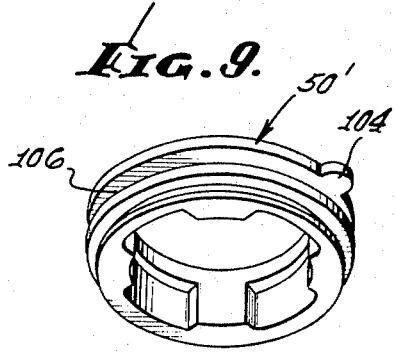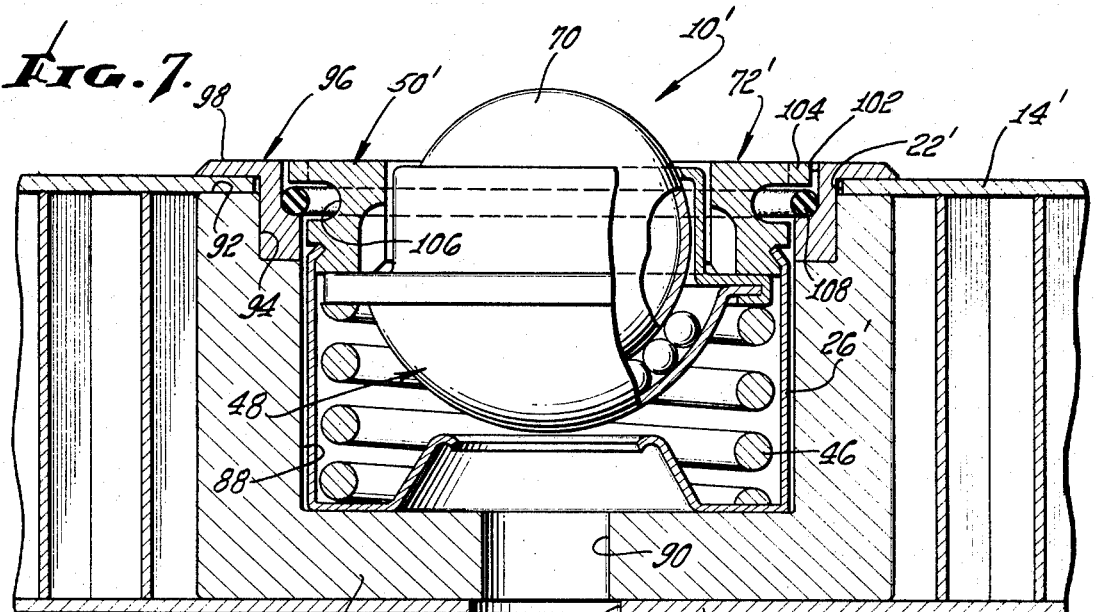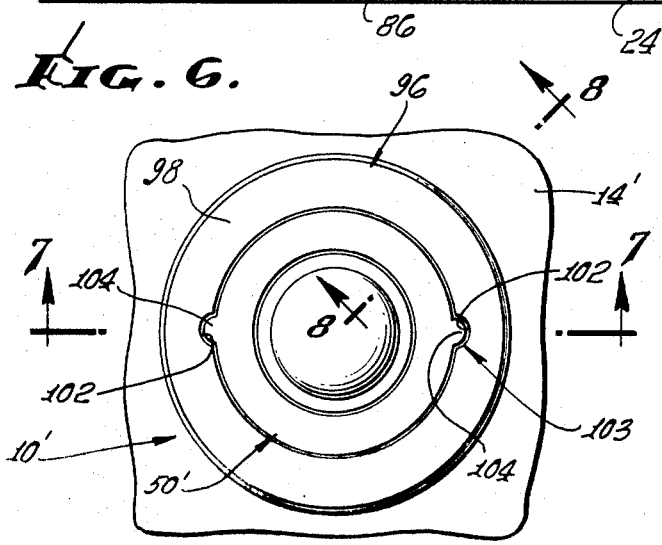

BALL TRANSFER UNIT

BACKGROUND OF THE INVENTION

In prior art ball transfer units, particularly those adapted for use in cargo handling systems where cargo is moved thereover, the units are usually permanently embedded within the floor or other structure and thus when damaged are difficult, if not impossible, to remove and repair.

In the prior art ball transfer units which are removable from a floor or other structure, the unit itself utilizes interior guide members to maintain the load spring in appropriate alignment and the weight of the ball transfer unit is increased. It is to be realized that in a cargo handling system, a plurality of these ball transfer units are utilized, and when used in aircraft, weight becomes critical which cannot be reduced by these prior art devices.

SUMMARY OF THE INVENTION

It is an object of the present invention to provide an improved ball transfer unit which may be flexed or axially displaced to overcome excessive cargo loads positioned thereon.

It is another object of this invention to provide a ball transfer unit which is removable from a floor or other structure for repair or replacement if damaged, and improved releasable locking means to accomplish the same.

Another object of this invention is to provide a ball transfer unit which within limits may be displaced angularly relative to a vertical axis therethrough which increases the efficiency of the ball transfer unit as cargo comes into contact therewith.

A further object of the invention is an improved guide means for the load spring means upon which the ball of the ball transfer unit rests thereby decreasing the number of parts of the ball transfer unit and lessening the weight of the entire unit.

These and other objects and advantages will become apparent from the following description and drawings, wherein:

BRIEF DESCRIPTION OF THE DRAWINGS

FIG. 5 is a cross sectional view of a modified ball transfer unit showing a different configuration of outer housing than illustrated in FIG. 3;

FIG. 6 is a top plan view of a modified form of ball transfer unit;

FIG. 7 is a cross sectional view of the modified ball transfer unit taken on line 7—7 of FIG. 6;

FIG. 8 is a detailed view of a modified locking means taken on line 8—8 of FIG. 6; and FIG. 9 is a perspective view of the cover top guard of the modified ball transfer unit illustrated in FIGS. 6 through 8.

BRIEF DESCRIPTION OF THE PREFERRED EMBODIMENTS

Figure 1:
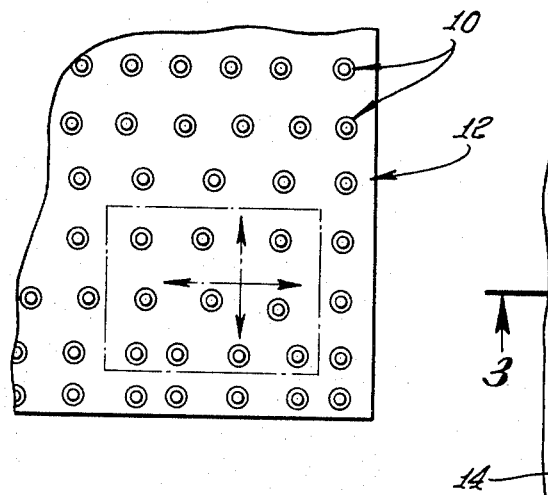
FIG. 1 is a top plan environmental view of a plurality of the ball transfer units mounted in a structure of a cargo handling system.
Figure 2:
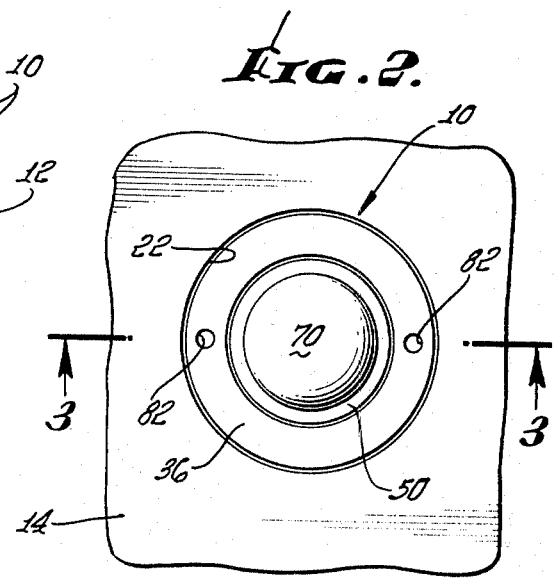
FIG. 2 is an enlarged top plan view of a single ball transfer unit.

In FIG. 1 there is illustrated a plurality of ball transfer units generally designated 10 mounted in a platform 12 which in the case of aircraft can be the floor section where cargo, such as illustrated by the phantom lines in FIG. 1, will roll over the platform 12 on the ball transfer units 10. As can be seen by the arrows in FIG. 1, the individual ball transfer units 10 which are prepositioned in the platform 12 in any desired relationship will allow the cargo or object to be moved in any direction on the horizontal plane of the platform 12.

Figure 3:
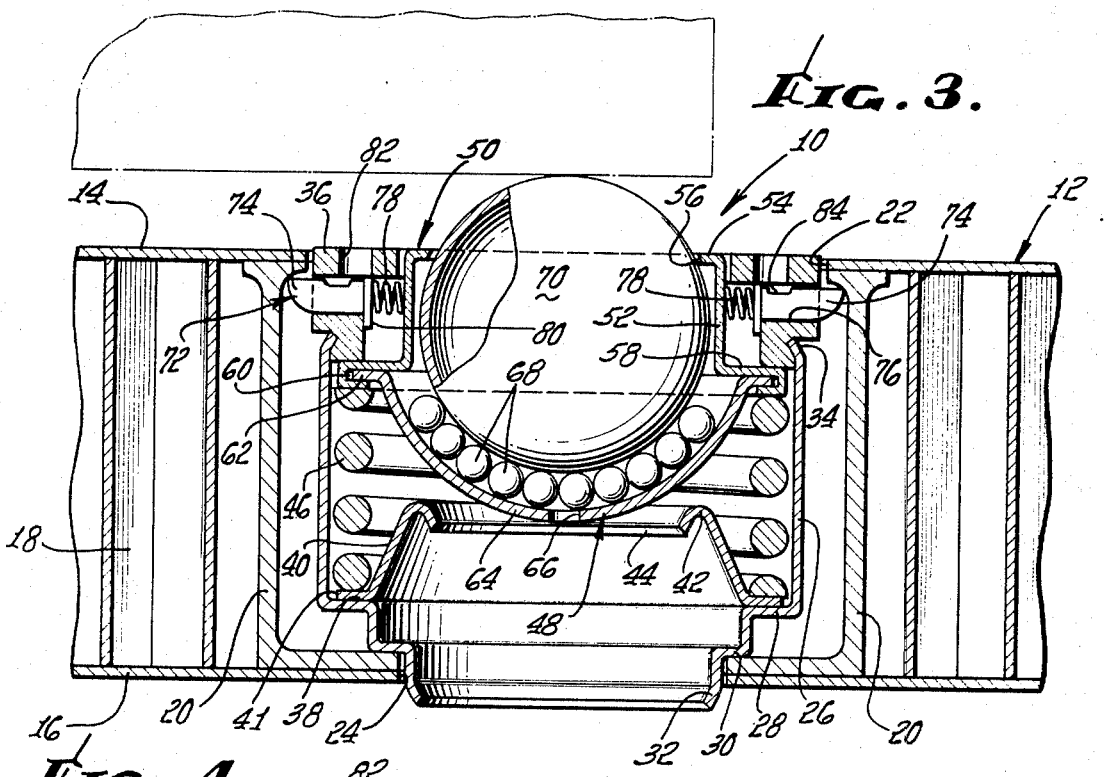
FIG. 3 is a cross sectional view taken on line 3—3 of FIG. 2 illustrating the details of the ball transfer unit and its positioning within a floor or other structure.
Figure 4:
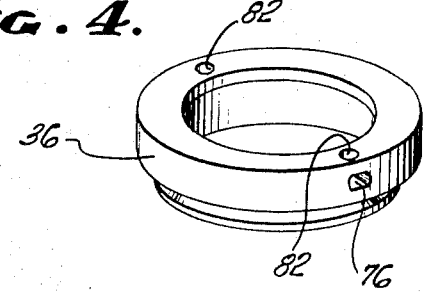
FIG. 4 is a perspective view of the top guard cover forming a part of the ball transfer unit.

Referring to FIG. 3, for purposes of illustration, the platform 12 may comprise an outer skin 14 of relatively thin material and in the case of aircraft, it is usually aluminium, a spaced apart parallel inner or bottom skin 16 and between the respective skins 14 and 16 any type of honeycomb fill 18 may be used. In certain cases, the fill could be independent ribs, plywood, etc. Conventionally, however, in the areas where the ball transfer units 10 are to be positioned within the platform 12, a pair of spaced apart vertical ribs 20 are positioned defining the area into which the ball transfer unit 10 is to be seated. The outer skin 14 is annularly cut, forming an opening 22 to receive a ball transfer unit 10. Additionally and preferably, an opening 24 is formed in the bottom or inner skin 16 to allow the ball transfer unit to be seated between the ribs 20, and to assure proper moisture drainage from the top of the outer skin 14 out the opening 24.

The ball transfer unit 10 preferably includes a cylindrical housing or bottom can 26 having a vertical axis. The housing 26 at the bottom thereof is provided with a first annular undercut shoulder 28 and is further reduced in diameter forming a second undercut shoulder 30 wherein the reduced annular end piece 32 has a diameter slightly less than the opening 24 in the inner or bottom skin 16 whereby it may project therethrough as illustrated in FIG. 3. This will assure proper seating of unit 10. The upper end 34 of the cylindrical housing 26 is canted inwardly adapted to engage and hold an annular top guard cover 36.

Mounted on the inner surface 38 of the shoulder 28 is a stop means 40 having an annular tab 41 and which is preferably frusto-conical and extends upwardly from the shoulder 28. At its upper end 42 it is turned inwardly forming an annular opening 44. The tab 41 is welded or otherwise secured to the surface 38.

Mounted within the cylindrical housing 26 and resting upon the annular tab 41 is a load spring 46 which is disposed axially within the housing or bottom cam 26 as best seen in FIG. 3. Preferably, the load spring 46 has a plurality of convolutions extending around the interior of the housing 26 and from the tab 41 upward to a point where it engages a ball race assembly 48.

The ball race assembly 48 includes an annular wall cover 50 which includes a vertical wall 52, an inturned shoulder 54 defining an opening 56 and a bottom leg 58 running outwardly from the wall 52 and normal thereto. At the end of the bottom annular leg 58 the ball cover 50 is crimped over or turned inwardly forming a slot 60 which receives the annular flange 62 of a ball race cup 64. As can be seen from FIG. 3, the ball race cup 64 is preferably semicircular in cross section. The ball race cup 64 preferably includes a bottom opening 66 to insure proper drainage of moisture which may fall into the ball race assembly 48.

Positioned in the ball race cup 64 are a plurality of support balls 68 forming a concave semicircular bed to receive a preferably hollow transfer ball 70. As can be seen in FIG. 3, the ball cover 50 extends above the transfer ball 70 so that the opening 56 formed thereby is of a diameter less than the diameter of the ball 70 and will retain the ball 70 within the ball race assembly 48 but will allow free rotation of the ball 70 in any direction when engaged by cargo.

When the ball transfer unit 10 is assembled as described, the load spring 46 will be urged against the ball race assembly 48 maintaining the ball 70 in an elevated position for engagement by cargo. However, because of the fact that some of the balls 70 might be higher or lower in relationship to the outer skin 14, the weight of the cargo may depress the ball 70 and in turn the load spring 46 so that there is an equalization of the weight of the piece of cargo over the entire set of ball transfer units 10. Even if a ball 70 is annularly engaged by cargo, relative to the vertical axis, the spring 46 being free of internal obstruction is distortable normal to the axis and assures proper ball leveling and distribution of cargo weight.

As can be seen from FIG. 3, the stop means 40 having an annular opening 44 which is of less diameter than the ball race cup 64 will restrict axial downward movement of the ball race assembly 48 and the cup 64 will bottom out within the opening 44 against the upper end 42 of the stop means 40. Also with the frusto-conical shape of the stop means 40 the load spring 46 will be maintained in axial alignment should an uneven weight load tend to distort the axial alignment thereof.

In order to retain the ball transfer unit 10 in position in the Platform 12, there is preferably employed locking means generally designated 72. These locking means comprise opposed lock bolts 74 which are slidably mounted in openings 76 running normal to the longitudinal axis of the ball transfer unit 10. There is also included return springs 78 which engage the end 80 of the lock bolts 74 and the vertical wall 52 of the ball cover 50 so that the springs 78 will constantly urge the lock bolts 74 outward for engagement with the ribs 20.

When it is desired to remove the ball transfer unit 10, a screw driver or other implement is inserted in openings 82 in the top of guard cover 36 to engage notches 84 of bolts 74 and push the lock bolts 74 against the springs 78 whereby the lock bolts are moved inwardly and out of engagement with the vertical ribs 20 and the unit 10 is then lifted out and removed from the platform 12 for either repair or replacement as the case may be.

The modification of the ball transfer unit 10 illustrated in FIG. 5 is in all respects the same as that unit illustrated in FIG. 3 with the exception that the cylindrical housing or bottom can 26' does not include shoulders but is adapted to seat directly on the inner or bottom skin 16 of a platform 12, and further, the stop means 40' is integrally formed into the housing 26' as the bottom thereof.

In FIGS. 6 through 9, the modification of the ball transfer unit 10' resides in the locking means 72' and also in the element within which the ball transfer unit 10' is seated. In this modification there is illustrated the outer skin 14', inner skin 16' and mounted between the respective skins 14' and 16' is a cylindrical mounting means or ball mat 86. This mat 86 may be formed of any particular material and includes a cutout portion 88 adapted to conform to the exterior of the housing 26' and locking means 72'. There is also provided in the ball mat 86 a drain opening 90 which is aligned with the drain opening 24' in the skin 16'. At the top 92 of the ball mat 86, an interior annular cutout 94 is provided. The opening 22' in the upper skin 14' is preferably slightly larger than the annular cutout 94. Seated within the cutout 94 is an annular ring insert 96 which extends downwardly into the cutout and includes an annular top tab portion 98 adapted to rest upon the skin 14'. While the drawing illustrates the tab as resting on top of the skin 14' it should be noted that the skin 14' may be recessed so that the tab 98 will lie on a complementary plane with the top surface of the skin 14' without departing from the spirit of the invention. Such construction would prevent a pallet or piece of cargo from in any manner disengaging the ball transfer unit 10' from the platform 12.

The annular ring insert 96 is further provided with an annular interior groove 100 best seen in FIG. 8. The ring insert 96 also includes a pair of vertical semicircular cutout portions 102 diametrically opposite from each other, as best seen in FIG. 6 forming anti-rotational means 103. These cutout portions 102 are adapted to receive semicircular ears 104 formed on the ball cover guard 50'. When the entire ball transfer unit 10' is seated in the ball mat 86, the ears 104 are aligned with the cutout portions 102 so that the ball transfer unit 10' will be horizontally stabilized against rotation. While the drawings illustrate a pair of ears 104 forming a part of the anti-rotational means 102, one such cutout 102 and complementary semicircular ear 104 can be utilized to prevent horizontal rotation of the ball unit 10'.

In order to retain the ball transfer unit 10' within the ball mat 86, the ball guard cover 50' is provided with an inwardly struck annular groove 106 alignable with the annuar groove 100 in the ring insert 96. Aligned with the groove 106 of the lockinG means 72' is an annular retainer ring 108. This retainer ring 108 is adapted to interfit, as it pushes radially outward, within the annular groove 100 as best shown in FIG. 8.

The retainer ring 108 while preferably of resilient material such as rubber, may be formed of metal and be equally as effective. Additionally, the construction of the respective grooves 106 and 100 may be varied without departing from the spirit of the invention. The important point is that the diameter of the retainer ring 108 be larger than the diameter of the ball guard cover 50' so that when the entire ball unit 10' is inserted within the ring insert 96 there is a pressure fit of the retainer ring against the ring insert 96.

In order to remove the ball transfer unit 10' from the mat 86 any implement may be used and inserted between the ball guard cover 50' and the ring insert 96 to pry the retainer ring 108 inwardly into the annular groove 106 so that the whole unit 10' may be removed.

While each of the ball transfer units 10 are illustrated with specific housings 26, 26' and locking means 72, and 72', it should be apparent that the housings and locking means are interchangeable and further that the ball mat 86 could be used equally as well with the unit 10 illustrated in FIG. 3 as with the unit 10' illustrated in FIG. 7.

Although I have herein shown and described my invention in what I have conceived to be the most practical and preferred embodiment, it is recognized that other departures may be made therefrom within the scope of my invention.

I claim:

1. In a removable ball transfer unit adapted to receive cargo for movement thereover wherein said unit includes a cylindrical housing having a vertical axis and adapted to be mounted in a platform; a ball race assembly including a cup member, a plurality of roller balls reposing therein and a rotatable cargo engageable ball resting on said roller balls and including a ball cover to prevent removal of said cargo engaging ball from said assembly yet allowing rotation thereof, said assembly being retained within said housing yet adapted to move axially therein within limits, the improvements comprising a load spring having a plurality of convolutions and said spring being seated in said housing and contacting said ball race assembly urging said assembly axially outwardly, said spring convolutions being free of inward restraint and distortable normal to said axis; stop means fixedly mounted in said housing directly engageable by said ball race assembly to limit axial inward movement thereof and releasable locking means associated with said unit adapted to retain said unit in said platform and wherein said stop means includes an axially upwardly projecting frusto-conical member having an opening at the top thereof, said opening adapted to receive a portion of said cup member and prevent further axial inward movement thereof.

2. A removable ball transfer unit as defined in claim 1 wherein said ball race assembly includes anti-rotational means adapted to prevent horizontal rotation of said unit.

3. A removable ball transfer unit as defined in claim 1 wherein said releasable locking means includes an annular resilient ring member annularly engaging said housing and said platform.

* * * * *